United States Patent Office 3,401,519
Patented Sept. 17, 1968

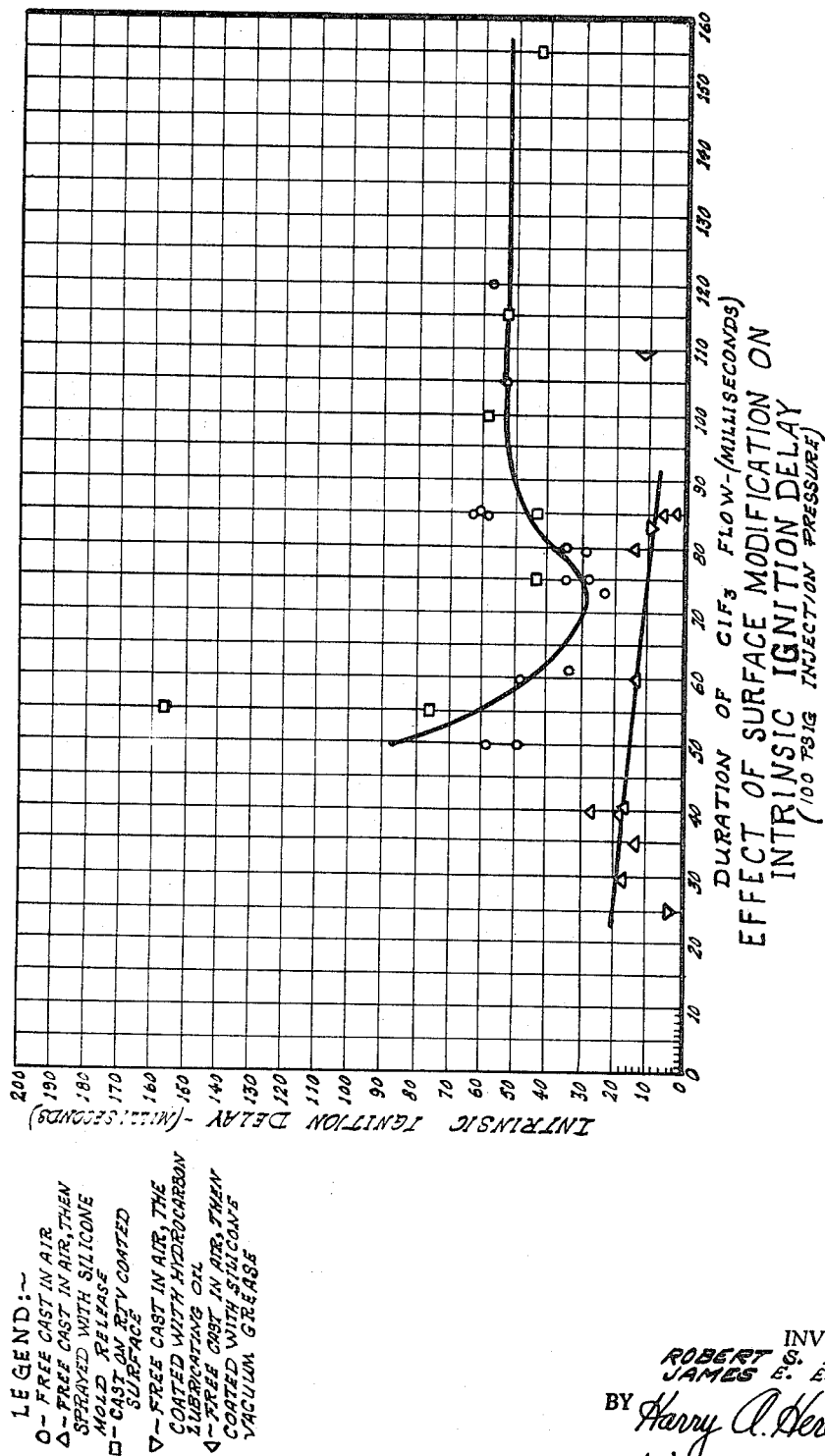

3,401,519
HYPERGOLIC IGNITION OF COATED COMPOSITE PROPELLANT GRAIN
Robert S. Brown, Santa Clara, and James E. Erickson, Sunnyvale, Calif., assignors to the United States of America as represented by the Secretary of the Air Force
Filed Nov. 15, 1966, Ser. No. 594,637
4 Claims. (Cl. 60—39.06)

ABSTRACT OF THE DISCLOSURE

An improved method for igniting composite type solid propellant grains by first applying a coating of a hydrocarbon or silicone-base lubricant to the burning surfaces of a propellant grain followed by the step of contacting the coated surfaces of the propellant grain with a hypergolically reactive fluid capable of penetrating the coating to effect autoignition of the propellant grain's burning surface.

---

This invention relates to solid propellants useful for rocket propulsion. In a more specific aspect, it relates to a method for enhancing the hypergolic ignition characteristics of solid rocket propellants of the composite type. Composite type propellants usually comprise an intimate mixture of a finely divided oxidizer uniformly distributed in a resinous binder which acts as a fuel. Other materials may also be included as additives to improve fabrication or ballistic characteristics. For example, fillers, stabilizers, burning rate modifiers or catalysts, plasticizers, curing agents and ignition aids such as finely divided aluminum are often added to propellant formulations. The various ingredients making up the propellant composition are blended and mixed thoroughly using conventional mixing equipment. The mixture is then formed into a desired shape by compression molding, injection molding or extrusion followed by curing at either room temperature or elevated temperatures.

As the utilization of solid propellants increases, the problem of ignition becomes of paramount importance because of the inherent difficulty in properly igniting these materials. The ignitability of solid propellants often varies due to condensation of moisture on the propellant surfaces and variations in propellant surfaces due to extrusion and curing phenomenon. Consequently, it often becomes difficult to ignite the propellant materials in a reproducible manner throughout a wide range of temperature conditions. Also, incomplete ignition of the propellant grain generally produces relatively long periods of ignition delay or lag often resulting in misfires.

Various ignition systems have been employed with some degree of success in attempting to improve the ignitability of solid propellants. One of the more successful systems, commonly referred to as hypergolic ignition, involves the use of a hypergolic reactive chemical. This technique is accomplished by spraying the surface of the propellant material with a hypergolic fluid such as chlorine trifluoride. When the fluid contacts the surface of the propellant, an exothermic reaction is initiated which raises the temperature of the propellant to its autoignition temperature. This type of system is flexible, simple in design and can be readily employed with a variety of rocket motors. It suffers a disadvantage, however, in that unreasonably long ignition delays often occur when the hypergolic technique is employed with composite type solid propellants. This disadvantage seriously impairs the usefulness of an otherwise desirable system for igniting solid propellants.

Accordingly, the primary object of this invention is to provide an improved hypergolic ignition system for composite type solid rocket propellants.

Another object of this invention is to provide a hypergolic ignition system that minimizes ignition lag or delay upon the firing of solid rocket propellants.

Still another object of this invention is to provide a hypergolic ignition system that improves the ignitability of solid rocket propellants over a wide range of temperatures, and is relatively unaffected by the surrounding chemical and moisture conditions of its environment.

A further object of this invention is to provide a hypergolic ignition system that will exhibit stability over relatively extended periods of time.

The above and still further objects, advantages and features of this invention will become readily apparent upon considering the following detailed description thereof and the accompanying drawing in which the figure is a graphic illustration demonstrating the advantages of this invention.

According to the invention, it has been found that the aforestated objects can be accomplished by applying silicone-base and hydrocarbon-base lubricants to the surface of composite type solid propellants. When the treated surfaces are contacted with a hypergolic reactive-type oxidizer such as chlorine trifluoride, significant decreases in ignition delays are found to occur compared to ignition delay times for untreated surfaces. The ignition of the treated surfaces is also more vigorous since the ignition spreads over the entire surface of the propellant grain at extremely rapid rates.

The lubricating agents which are applied to the surfaces of the propellant grains in accordance with this invention possess extremely low vapor pressures, thereby permitting long periods of rocket motor storage without significant reduction in the original improvement in the ignition characteristics of the treated propellant grain.

These lubricants include silicone-base lubricants; such as silicone oils and silicone greases, as well as hydrocarbon lubricating oils. The hydrocarbon oils used in this invention can be derived from natural crude oil, that is mineral oils such as naphthenic oils, paraffinic oils or mixed base oils; or synthetic lubricants. The silicone lubricants used in the invention are nonresinous polymeric organosilicone compounds substantially free from reactive substituents attached to the silicon atoms. The preferred organosilicone polymers this invention is concerned with are the alkyl and aryl substituted siloxanes of varying chain lengths and room temperature viscosities from 50–1000 centistokes, such as dimethyl polysiloxane, phenylmethyl polysiloxane, diethyl polysiloxane, butylmethyl polysiloxane and trimethylsilyl end-blocked dimethyl silicone oils, as well as the above silicone oils converted to greases by conventional methods. For example, silica aerogel when combined with methyl silicone oil forms a stop-cock lubricant which can be effectively utilized with this invention as a coating agent for propellant grains.

By referring to the figure in the drawing, it can be demonstrated that the application of the lubricating agents contemplated by this invention to the surface of a propellant grain produces significant advantages in the ignition characteristics of the treated propellant. The test equipment used in obtaining the results outlined in the graph of the figure was a box or chamber with windows on two sides. Propellant samples 1.75 inches in diameter, both treated and untreated, were placed on a canted pedestal which was located at the center of the box floor. The combustion products were exhausted through a vent in the side of the combustion chamber. The hypergolic reactive fluid was injected through an injector and a solenoid valve assembly located in the top of the chamber and onto the propellant surface. By control of the injector pressure drop and the duration of the current flow through the solenoid, the rate of hypergol flow to the propellant surface and the duration of the flow can be controlled within predetermined parameters. Ignition of the propellant grain was detected by a photocell which viewed the propellant surface through one of the windows on the side of the chamber. Thus, by simultaneously recording the current through the solenoid and the photocell output on an oscillograph recorder, the total system ignition delay (apparatus delay time plus intrinsic delay) could be determined from the time difference between the two signals. The apparatus delay time was determined separately so that the true intrinsic ignition delay (from first hypergol-propellant contact to ignition) could be determined.

This invention is applicable to any of the composite type solid propellants, but has been found especially useful with solid propellants of the aluminized ammonium perchlorate type having a polybutadiene-acrylic acid-acrylonitrile binding system. Table I sets forth a specific example of this type of solid propellant and represents the propellant material used in the examples of this invention.

TABLE I

| Composition: | Percent by weight |
|---|---|
| Ammonium perchlorate | 68 |
| Aluminum | 16 |
| Binder | 16 |
| Additives | 0 |

A propellant grain was prepared in accordance with the formulation of Table I and compounded in a conventional manner. The surface of the propellant grain was treated by coating with either a silicone or hydrocarbon lubricant. The propellant was then placed in the test chamber described above in order to obtain the results set forth in the graph of the figure. The following examples illustrate specific embodiments of the invention.

EXAMPLE 1

The propellant of Table I was free cast in air and cured in open planchettes at 160° F. The free surface being the surface which would eventually be contacted by the hypergolic fluid used to initiate burning of the propellant grain.

EXAMPLE 2

A second sample of the solid propellant of Table I was cured at 160° F. on an aluminum surface which had been previously coated with a silicon rubber type mold release agent, commonly referred to as RTV.

EXAMPLE 3

A third series of samples of the propellant of Table I were cured in open planchettes at 160° F. as in Example 1. After curing the surface was spray-coated with a thin coat of a silicone oil lubricant. (Sprayon No. 205 from Sprayon Products, Inc., a silicone-base mold release agent was the specific lubricant utilized.)

EXAMPLE 4

A fourth series of samples of the propellant of Table I were cured in a manner similar to that of Example 1 except the free surface of the cured propellant was coated with a thin layer of a hydrocarbon base lubricating oil.

EXAMPLE 5

A fifth series of samples of the propellant of Table I were cured in accordance with the procedure outlined in Example 1 above except the free surface of the propellant was covered with a thin layer of a silicon base vacuum grease (Dow Corning Hi Voc Grease).

The results produced from testing the untreated propellant grains of Examples 1 and 2 and the treated propellant grains of Examples 3, 4 and 5 are shown in the graph of the figure and also in Table II.

TABLE II.—SUMMARY OF IGNITION DATA FREE SURFACE CAST IN AIR

| Run No. | Propellant Batch No. | Average Pressure, p.s.i.a. | Pulse Duration, msec. | System Delay | Intrinsic Delay |
|---|---|---|---|---|---|
| 65 | 23 | 100 | 85 | 85 | 63 |
| 66 | 23 | 100 | 85 | 85 | 63 |
| 67 | 23 | 100 | 120 | 80 | 58 |
| 69 | 23 | 100 | 75 | 50 | 28 |
| 70 | 4 | 100 | 80 | 55 | 33 |
| 71 | 4 | 100 | 50 | 80 | 58 |
| 72 | 23 | 100 | 35 | ∞ | ∞ |
| 73 | 4 | 100 | 45 | ∞ | ∞ |
| 82 | 23 | 100 | 62 | 55 | 33 |
| 83 | 4 | 110 | 75 | 55 | 33 |
| 84 | 4 | 100 | 60 | 70 | 48 |
| 85 | 4 | 100 | 105 | 75 | 53 |
| 86 | 4 | 100 | 80 | 50 | 28 |
| 87 | 4 | 100 | 85 | 80 | 58 |
| 90 | 4 | 110 | 50 | 70 | 48 |
| 91 | 4 | 100 | 73 | 45 | 23 |
| 92 | 34 | 50 | 80 | 80 | 58 |
| 94 | 34 | 50 | 65 | 150 | 128 |
| 96 | 34 | 50 | 105 | 65 | 43 |
| 98 | 34 | 50 | 110 | 80 | 58 |
| 99 | 34 | 50 | 85 | 85 | 63 |
| 101 | 34 | 50 | 100 | 80 | 58 |
| 102 | 34 | 50 | 65 | 130 | 108 |
| 104 | 34 | 50 | 70 | 105 | 83 |
| 105 | 34 | 200 | 75 | 55 | ¹33 |
| 106 | 34 | 190 | 70 | 50 | 28 |
| 107 | 34 | 190 | 120 | 65 | 43 |
| 108 | 34 | 190 | 105 | 60 | 38 |
| 109 | 34 | 195 | 60 | 375 | 353 |
| 110 | 40 | 190 | 55 | 120 | 98 |
| 111 | 40 | 190 | 50 | 50 | 28 |
| 112 | 40 | 193 | 60 | 70 | 48 |
| 113 | 40 | 193 | 60 | 80 | 58 |
| 114 | 40 | 195 | 80 | 60 | 38 |
| 115 | 40 | 195 | 95 | 80 | 58 |

¹ Initial fire may not have been on propellant surface.

FREE CAST MODIFIED SURFACE STUDIES

| Run No. | Propellant Batch | Average Pressure | Pulse Duration | System Delay | Intrinsic Delay | Surface Conditions |
|---|---|---|---|---|---|---|
| 116 | 40 | 198 | 85 | 30 | 8 | Applied Sprayon No. 205. Mold Release just below test. |
| 118 | 40 | 100 | 80 | 35 | 13 | Do. |
| 119 | 40 | 95 | 60 | 35 | 13 | Do. |
| 120 | 40 | 95 | 40 | 50 | 28 | Do. |
| 121 | 40 | 95 | 30 | 40 | 18 | Do. |
| 122 | 40 | 05 | 95 | 30 | 8 | Applied Lubricating Oil. |
| 123 | 40 | 95 | 85 | 25 | 3 | Applied Sprayon No. 205 to ½ of surface. |
| 126 | 40 | 95 | 35 | 25 | 3 | Applied Lubricating Oil. |
| 131 | 45 | 95 | 95 | 40 | 18 | Applied Sprayon No. 205. |
| 132 | 45 | 100 | 95 | 40 | 18 | Do. |
| 133 | 45 | 95 | 115 | 35 | 13 | Do. |
| 136 | 45 | 95 | 110 | 35 | 13 | Applied Dow Corning Hi Voc Grease. |

MOLD CAST SURFACE

| Run No. | Propellant Batch | Average Pressure | Pulse Duration | System Delay | Intrinsic Delay | Comments |
|---|---|---|---|---|---|---|
| 68 | 23 | 100 | 120 | 150 | 128 | Cast on Aluminum without mold. |
| 129 | 45 | 100 | 115 | 40 | 18 | Cast on Aluminim with release. |
| 130 | 45 | 100 | 120 | 180 | 158 | Cast on Aluminum without release. |
| 160 | 57 | 100 | 55 | 170 | 148 | Cast on RTV coated Aluminum. |
| 161 | 57 | 100 | 75 | 65 | 43 | Do. |
| 162 | 57 | 100 | 55 | 95 | 73 | Do. |
| 163 | 57 | 100 | 100 | 80 | 58 | Do. |
| 165 | 57 | 100 | 155 | 65 | 43 | Do. |
| 166 | 57 | 100 | 115 | 75 | 53 | Do. |
| 167 | 57 | 100 | 85 | 65 | 443 | Do. |

The data set forth in Table II and graphically illustrated in the drawing demonstrates that the first two types of surface have equivalent ignition characteristics and have a minimum ignition delay with the chlorine trifluoride hypergol of 55 milliseconds or greater. However, the propellant grains of Example 3, 4 and 5, the surfaces of which were treated in accordance with this invention, are shown to have ignition delays of less than 20 milliseconds with the same hypergol and same hypergolic flow rates. These results demonstrate that the treatment of the surfaces of compositive type solid propellant grains with the lubricating agents of this invention significantly enhances the hypergolic ignition characteristics of the propellant grain. The ignition delay is considerably reduced and the rate of ignition propagation to the entire propellant surface is greatly increased.

While the invention has been described with particular reference to specific embodiments thereof, it is to be clearly understood that the present disclosure of the specific embodiments has been made only by way of illustration and that numerous changes in the details of this invention may be resorted to without departing from the spirit and scope of the invention as hereinafter claimed.

What is claimed is:
1. A method for uniformly igniting a composite type solid propellant grain which comprises the steps of applying a coating to the ignition surface of a composite type solid propellant grain, said coating comprising an ignition enhancing agent selected from the group consisting of hydrocarbon-base oil lubricants, silicone-base oil lubricants and silicone-base grease lubricants, contacting said surface coated grain with a hypergolic fluid capable of penetrating to the ignition surface of the said grain in order to initiate an exothermic reaction and raise the temperature of the said grain to its autoignition temperature.

2. A method in accordance with claim 1, wherein said lubricating agent is a silicone-base oil.

3. A method in accordance with claim 1, wherein said lubricating agent is a silicone-base grease.

4. A method in accordance with claim 1, wherein said lubricating agent is a hydrocarbon-base petroleum oil.

References Cited
UNITED STATES PATENTS

| | | | |
|---|---|---|---|
| 3,120,184 | 2/1964 | Ellern | 102—37.8 |
| 3,147,710 | 9/1964 | Gluckstein | 102—70 |
| 3,250,829 | 5/1966 | Wall | 149—2 X |

BENJAMIN R. PADGETT, *Primary Examiner.*